United States Patent

[11] 3,633,363

| [72] | Inventor | Lester J. Larsen |
| | | South Bend, Ind. |
| [21] | Appl. No. | 43,072 |
| [22] | Filed | June 3, 1970 |
| [45] | Patented | Jan. 11, 1972 |
| [73] | Assignee | The Bendix Corporation |

[54] HYDRAULIC BOOST DEVICE WITH EMERGENCY FLUID SUPPLY
8 Claims, 1 Drawing Fig.

[52] U.S. Cl.................................................. 60/51, 60/54.6 P, 91/6
[51] Int. Cl..................................................... F15b 1/02, F15b 20/00
[50] Field of Search........................................ 60/51, 54.6 P; 91/6

[56] References Cited
UNITED STATES PATENTS

| 3,353,451 | 11/1967 | Garrison et al. | 91/6 |
| 2,908,137 | 10/1959 | Spalding et al. | 60/51 |
| 2,956,405 | 10/1960 | Spalding et al. | 60/51 |
| 3,131,538 | 5/1964 | Schultz et al. | 60/51 |

*Primary Examiner*—Edgar W. Geoghegan
*Attorneys*—K. C. Decker and Plante, Hartz, Smith and Thompson ABSTRACT: A hydraulic brake booster is disclosed which provides a power assist to the vehicle operator during a brake application. Pressurized hydraulic fluid is supplied to the booster from the vehicle's power steering pump which also supplies pressurized fluid for charging an accumulator. During normal operation of the system, fluid is supplied directly from the pump to the booster. However, if a malfunction interrupts the supply of pressurized fluid from the pump, the booster can use the fluid stored in the accumulator to apply the vehicle's brakes.

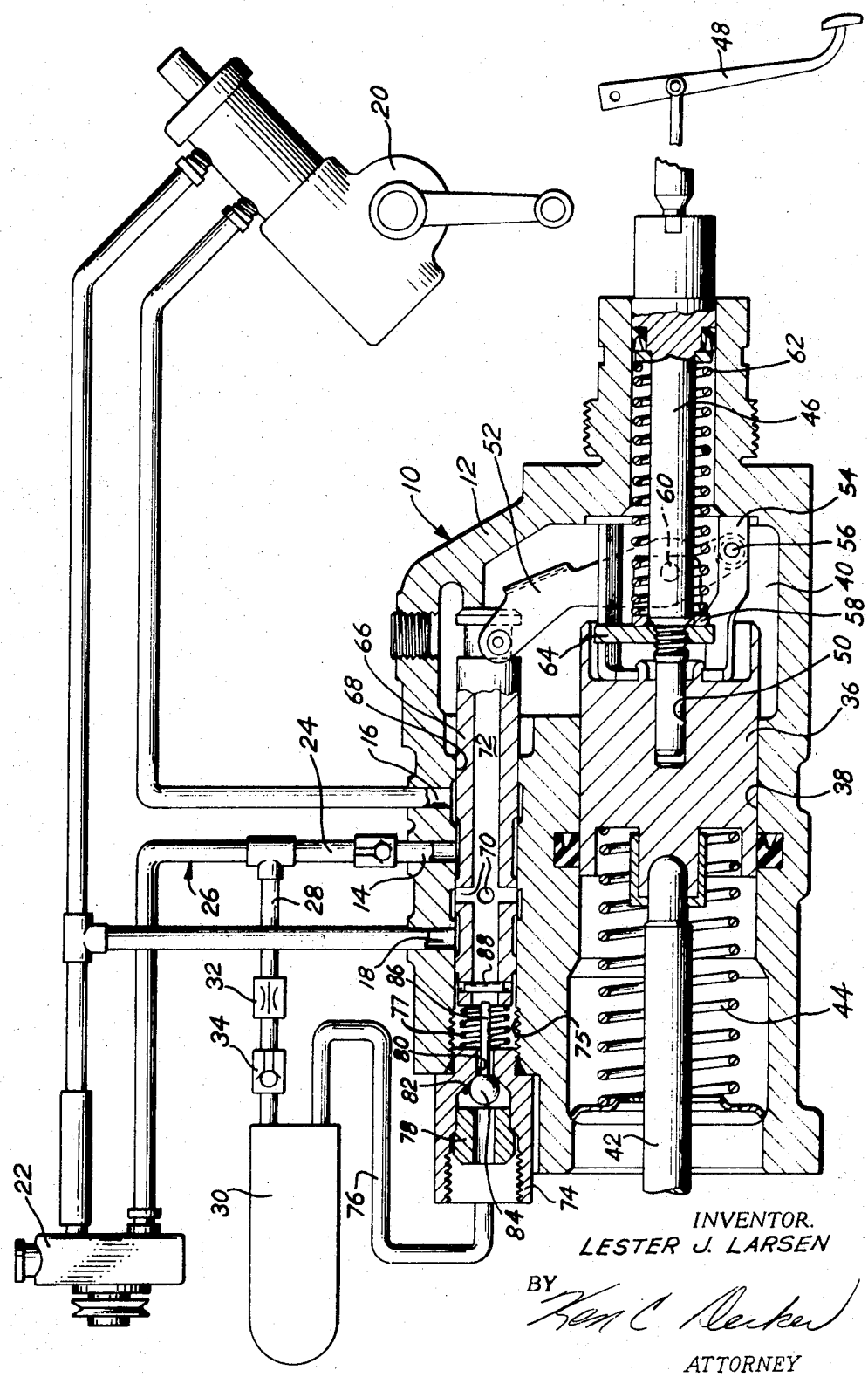

HYDRAULIC BOOST DEVICE WITH EMERGENCY FLUID SUPPLY

BACKGROUND OF THE INVENTION

This invention relates to a vehicle hydraulic system which includes a hydraulic brake booster.

Because of their smaller size and lower weight, hydraulic brake boosters are expected to be used in lieu of vacuum boosters in vehicles having power assisted brakes in the near future. Such a device is disclosed in U.S. Pat. application Ser. No. 793,923, filed Jan. 16, 1969, owned by the assignee of the present invention and incorporated herein by reference. This unit utilizes the pressurized fluid produced by the vehicle's power steering pump to provide a hydraulic assist to the vehicle operator when the brakes are applied. However, if a malfunction terminates flow of fluid to the booster, the power braking assist is lost immediately and the vehicle operator must apply the brakes manually. Since existing vacuum boosters provide a vacuum reserve for a few brake applications after a power failure, vehicle operators expect some power reserve so that the vehicle may be braked even after the engine stops operating.

SUMMARY OF THE INVENTION

Therefore, an important object of my invention is to provide a fluid reserve for a hydraulic brake booster that can operate the latter even after the vehicle's engine ceases to operate, or if a malfunction in the vehicle's hydraulic system terminates flow of fluid to the hydraulic booster.

Another important object of my invention is to insure that the accumulator used to store fluid for emergency use in my braking system is charged with fluid at all times when the system is functioning normally.

Another important object of my invention is to provide an accumulator charging system that does not use a charging valve or other cumbersome mechanical appliance to insure proper charging of the accumulator.

DRAWING DESCRIPTION

The sole FIGURE of the drawing is a schematic view of a vehicle hydraulic system made pursuant to the teachings of my invention with the boost device used therein illustrated in cross section.

DETAILED DESCRIPTION

Referring now to the drawing, a brake booster 10 includes a housing 12 having an inlet port 14, an outlet port 16, and a return or exhaust port 18. The outlet port 16 is communicated to the inlet port of a power steering gear 20, and the outlet port of the latter is communicated to the inlet of a power steering pump 22, as is the exhaust port 18 of the booster 10. A first branch 24 of a conduit 26 communicates the outlet of the pump 22 to the inlet port 14 of the booster 10, and a second branch 28 of the conduit 26 communicates the pump 22 to the inlet port of a pressurized fluid storage device or accumulator 30. Accumulator 30 may be of any suitable design which is well known to those skilled in the art, such as that disclosed in U.S. Pat. No. 3,282,786, owned by the assignee of the present invention, and incorporated herein by reference. Of course, any suitable device capable of storing fluid under pressure and expelling it for later use may be used in lieu of the accumulator 30. A restrictive orifice 32 in the branch 28 limits flow of fluid through the latter so that at least a portion of the fluid flowing in the conduit 26 is communicated to the inlet port 14. A check valve 34 is also provided in the branch 28 to prevent the accumulator 30 from expelling fluid into the conduit 26.

A piston 36 is slidable in a longitudinally extending bore 38 within the housing 12. One end of the piston 36 is slidably received in a boost chamber 40 within the housing 12. A rod 42 connects the other end of the piston 36 with a standard master cylinder (not shown) mounted on the left side of the housing 12 viewing the FIGURE. Movement of the piston 36 to the left develops pressure in the master cylinder in the usual manner to apply the vehicle's brakes. A return spring 44 also engages the other end of the piston 36 to return the latter to its normal position after the brakes are released.

A control rod 46 is slidable in the housing 12 and one end of the latter is connected to the usual brake pedal 48 in the vehicle operator's compartment. The other end of the rod 46 is slidably supported in a blind bore 50 in the piston 36. One end of a pair of levers 52 are secured to a bucket 54 mounted on the end of the piston 36 by pivots 56. The control rod 46 extends through an aperture in a U-shaped member 58 secured to the levers 52 by pivots 60. A spring 62 yieldably urges an abutment 64 on the rod 46 into engagement with the member 58. The construction of the levers 52, bracket 54, member 58 and the abutment 64 is disclosed in detail in copending U.S. Pat. application Ser. No. 14,133, filed Feb. 25, 1970 owned by the assignee of the present invention and incorporated herein by reference.

The other ends of the levers 52 are pivotally secured to one end of a spool valve or plunger 66 that is slidably carried in a bore 68 that communicates the ports 14, 16 and 18 with one another. In the position illustrated in the FIGURE, the spool valve 66 communicates substantially all of the fluid that flows into the inlet 14 directly to the outlet 16, and vents the chamber 40 to the low pressure side of the pump 20 through the exhaust port 18. When the vehicle operator depresses the brake pedal 48, spool valve 66 is shifted to the left viewing the FIGURE, terminating fluid communication between the chamber 40 and the exhaust port 18 and simultaneously directing a portion of the fluid flowing into the inlet 14 to the chamber 40 through radially extending passages 70 and a longitudinally extending passage 72 in the spool valve or plunger 66. Details of the construction and operation of the spool valve 66 are described in copending U.S. Pat. application Ser. No. 13,415, filed Feb. 24, 1970, owned by the assignee of the present invention and incorporated herein by reference.

A valve housing 74 is threadedly received in the end of the bore 68. A spring 77 is disposed between the housing 74 and the end of the valve 66 and yieldably urges the latter toward the brake release position. A conduit 76 communicates the accumulator 30 with an inlet port 78 on the housing 74. A longitudinally extending passage 80 communicates the port 78 with the bore 68 and is provided with a valve seat area 82 extending circumferentially thereabout. A ball valve member 84 is normally urged against the seat 82 by the fluid pressure in the accumulator 30. The valve member 84 is provided with a stem 86 projecting therefrom that extends through the passage 80 and into the bore 68 for engagement by an abutment 88 on the spool valve 66 when the latter is shifted a sufficient distance. The abutment 88 is preferably a pin that bridges the passage 72 but does not block flow of fluid from the passage 80 into the passage 72.

MODE OF OPERATION

In operation, the power steering pump 22 is driven by the vehicle's engine. When the output pressure of the pump 22 is raised above the existing accumulator fluid pressure as a result of operating either the power steering gear 22 or the brake booster 10, fluid will flow from the pump through the branch 28 into the accumulator 30, thereby assuring that the latter is maintained in a charged condition. The restriction 32 is provided to limit flow though the branch 28, thereby assuring an adequate fluid supply to the power steering gear 20 and booster 10.

When the vehicle's brakes are applied, control rod 46 moves to the left, viewing the FIGURE, thereby pivoting the levers 52 on the bracket 54 to move the spool valve from the position illustrated in the drawing in which the chamber 40 is communicated to the exhaust port 18 through the passages 70 and 72 to a position in which fluid communication between the chamber 40 and exhaust port 18 is terminated and a portion of the fluid flowing into inlet 14 is directed through the passages 70 and 72 to the chamber 40. Pressurized fluid in the chamber 40 forces the piston 36 to the left, viewing the FIGURE, thereby applying the vehichle's brakes. If fluid communication to the inlet 14 is terminated, due to a malfunction in the hydraulic system or because the vehicle's engine ceases operation, the valve 66 is shifted even further to the left when the operator depresses the pedal 48 until the abutment 88 engages the end of the valve stem 86. Further movement of the valve 66 forces the valve member 84 from the seat 86, thereby permitting fluid to discharge from the accumulator 30 through the conduit 76 and the passages 80 and 72 into the chamber 40, where the fluid acts against the end of the piston 36 to force it to the left viewing the FIGURE, to apply the vehicle's brakes in the normal manner.

What is claimed is:

1. In a vehicle braking system:
   a hydraulic boost device including a housing having an inlet, an outlet, and a chamber in fluid communication with said inlet;
   a piston shiftable in said chamber;
   a pressure source in fluid communication with said inlet;
   first valve means movable in said housing for controlling fluid communication between the inlet, the outlet, and the chamber for shifting said piston;
   means for storing fluid under pressure;
   first conduit means communicating said pressure source with said storage means;
   second conduit means communicating said storage means with said chamber; and
   second valve means operably connected to said second conduit means for controlling flow of fluid from the storage means into the housing;
   said second valve means opening to permit fluid communication between the storage means and the housing upon movement of the first valve means after fluid communication to said inlet is terminated.

2. The invention of claim 1; and
   a bore within said housing communicating said inlet with the outlet;
   said first valve means including a member slidable in said bore from a first position in which substantially all of the fluid flowing into the inlet is communicated to the outlet, a second position in which a portion of the fluid flowing into the inlet is communicated to the chamber for shifting said piston, and a third position in which said member opens said second valve means to permit flow of fluid to said chamber from said storage means.

3. The invention of claim 2:
   said member having a longitudinally extending passage therein and radially extending passages between said longitudinally extending passage and said inlet;
   said member cooperating with said second valve means to initiate fluid communication from the storage means to said chamber through said longitudinal passage after movement of said member to said third position after termination of fluid communication between the pressure source and the inlet.

4. The invention of claim 1; and
   a bore within said housing communicating the inlet with the outlet;
   said first valve means including a member movable in said bore from a first position in which substantially all of the fluid flowing into the inlet is communicated to the outlet to a second position in which a portion of the fluid flowing into the inlet is communicated to the chamber for shifting the piston, and to a third position after movement of said member to said second position and termination of fluid communication between said pressure source and said inlet;
   said second valve means including a portion extending into said bore for engagement by said member upon movement of the latter to said third position to permit said member to open said valve means to permit flow of fluid to the chamber.

5. The invention of claim 4; and
   abutment means on said member;
   said second valve means including passage means communicating said second conduit means with said bore, a valve seat circumscribing said passage means, a valve member for engagement with said seat to prevent flow of fluid through said passage means, and a stem extending from said valve member for engagement by said abutment means whereby said abutment means forces said valve member off of said seat upon movement of said member to said third position to permit flow of fluid through the passage means.

6. The invention of claim 5:
   said member defining a longitudinally extending passage therein for communicating said bore with said passage;
   said abutment means being a pin extending across longitudinal passage but permitting flow of fluid therethrough.

7. The invention of claim 6:
   said second valve means being mounted in one end of said bore substantially coaxially with said member;
   said stem extending through said passage means for engagement by said abutment.

8. The invention of claim 1:
   said first conduit means including a first branch in fluid communication with said inlet and a second branch in fluid communication with said storage means; and
   flow-restricting means in said second branch to insure that at least a portion of the fluid in said second conduit means is communicated to said inlet.

* * * * *